United States Patent
Denoue et al.

(10) Patent No.: US 9,179,096 B2
(45) Date of Patent: Nov. 3, 2015

(54) SYSTEMS AND METHODS FOR REAL-TIME EFFICIENT NAVIGATION OF VIDEO STREAMS

(71) Applicant: FUJI XEROX CO., LTD., Tokyo (JP)

(72) Inventors: Laurent Denoue, Verona (IT); Scott Carter, Mountain View, CA (US); Matthew L. Cooper, San Francisco, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 139 days.

(21) Appl. No.: 14/052,532

(22) Filed: Oct. 11, 2013

(65) Prior Publication Data

US 2015/0103131 A1 Apr. 16, 2015

(51) Int. Cl.
| | |
|---|---|
| *H04N 7/15* | (2006.01) |
| *G06F 3/0481* | (2013.01) |
| *G06F 3/16* | (2006.01) |
| *H04N 7/14* | (2006.01) |

(52) U.S. Cl.
CPC ............... *H04N 7/15* (2013.01); *G06F 3/0481* (2013.01); *G06F 3/167* (2013.01); *H04N 7/147* (2013.01)

(58) Field of Classification Search
CPC ... H04N 7/15; H04N 21/4334; H04N 19/105; H04N 19/176; G06F 3/0481; G06F 3/167
USPC .......................... 348/14.08; 370/260; 709/204
See application file for complete search history.

(56) References Cited

U.S. PATENT DOCUMENTS

| | | | |
|---|---|---|---|
| 8,117,544 B2 | 2/2012 | Adcock et al. | |
| 2001/0018693 A1* | 8/2001 | Jain et al. | 707/500 |
| 2004/0125124 A1* | 7/2004 | Kim et al. | 345/716 |
| 2005/0169371 A1* | 8/2005 | Lee et al. | 375/240.03 |
| 2005/0243167 A1* | 11/2005 | Clarke et al. | 348/14.12 |
| 2006/0146124 A1* | 7/2006 | Pepperell et al. | 348/14.08 |
| 2008/0298571 A1* | 12/2008 | Kurtz et al. | 379/156 |
| 2009/0113278 A1 | 4/2009 | Denoue et al. | |
| 2013/0307997 A1* | 11/2013 | O'Keefe et al. | 348/207.1 |
| 2014/0282724 A1* | 9/2014 | Chalozin et al. | 725/35 |
| 2014/0301464 A1* | 10/2014 | Wu et al. | 375/240.15 |
| 2014/0307042 A1* | 10/2014 | Heatley et al. | 348/14.08 |
| 2015/0100995 A1* | 4/2015 | Perlman et al. | 725/96 |

OTHER PUBLICATIONS

John Adcock et al. TalkMiner: A Lecture Webcast Search Engine. Proc. ACM Multimedia 2010, Oct. 25, 2010.
R. Baecker. A principled design for scalable internet visual communications with rich media, interactivity, and structured archives. CASCON '03, pp. 16-29.

(Continued)

*Primary Examiner* — Creighton Smith
(74) *Attorney, Agent, or Firm* — Pavel I. Pogodin, Esq.; TransPacific Law Group

(57) ABSTRACT

Described are systems and methods that allow a video conference participant to efficiently review semantically meaningful events within the video streams shared by their peers. Because participants are engaged in real-time communication, it is important to provide tools that let them quickly jump back to past events that were shown previously, not requiring them to manipulate a standard video timeline. Our techniques thus find meaningful events in the video stream such as scrolling pages, moving windows, typing text, etc. Using these techniques, a participant can then easily go back to e.g. the last PDF page shown by a peer, while still listening to the live audio.

21 Claims, 9 Drawing Sheets

(56) References Cited

OTHER PUBLICATIONS

Patrick Chiu, Jonathan Foote, Andreas Girgensohn, John S. Boreczky: Automatically linking multimedia meeting documents by image matching. Proc. Hypertext 2000, pp. 244-245.

Laurent Denoue et al. ProjectorBox: Seamless presentation capture for classrooms. World Conf. on E-Learn. in Corp., Govt. Health and Educat. (E-Learn 2005), Oct. 24, 2005.

Laurent Denoue, Scott Carter, Matthew Cooper, and John Adcock Real-time Direct Manipu-lation of Screen-based Videos Proc. IUI 2013, Mar. 19, 2013.

J.-Q. Song et al. A Framework for Indexing Personal Videoconference Video Data Management and Information Retrieval,S. Deb (ed.), Idea Group Publishing, 2004, pp. 293-320.

* cited by examiner

SYSTEMS AND METHODS FOR REAL-TIME EFFICIENT NAVIGATION OF VIDEO STREAMS

BACKGROUND OF THE INVENTION

1. Technical Field

The disclosed embodiments relate in general to systems and methods for video content processing in connection with video conferencing and video broadcast applications and, more specifically, to systems and methods for real-time efficient navigation of multiple video conferencing and video broadcast streams.

2. Description of the Related Art

Modern real-time group video conferencing systems well known to persons of ordinary skill in the art enable two or more users to engage in audio/video conferencing using audio and video streams sent over a computer network. During such conference, a computer screen of each conference participant is typically split into portions each showing a live stream from one of the conference participants with the total number of shown live streams being equal to the total number of conference participants. Conventional systems enable the conference participants to momentarily share their screen with others, for example to show a demo of a product, a web site, a deck of slides, or a document such as a PDF or a text editor file.

As illustrated in FIG. 1, in one exemplary scenario, a conference participant may decide to show her face in a screen 101, share her word document in a screen 102, switch back to showing her face in screen 103, and later show her screen where she types code in an editor in screen 104. Unlike text-based chat systems in which a person can readily scroll the chat window to refer to earlier parts of a transcript, participants in a video conference can only see the live frames. Stream recorders that record live conferencing sessions only let people record the streams for later viewing, but do not offer real-time navigation into the streams. Therefore, unfortunately, using the conventional conferencing technology, conference participants cannot review previous video frames in the live video stream: they can only see what their peers are sharing at the moment. This leads to decreased usability and user experience.

Therefore, the conventional video conferencing systems are deficient due to their lack of video stream navigation functionality. Thus, new and improved systems and methods are needed that would enable users to efficiently jump back into semantically meaningful parts of conference streams shared by their peers.

SUMMARY OF THE INVENTION

The embodiments described herein are directed to systems and methods that substantially obviate one or more of the above and other problems associated with the conventional video conferencing technology.

In accordance with one aspect of the embodiments described herein, there is provided a computer-implemented method performed in a computerized system incorporating a central processing unit, a display device, a network interface and a memory. The computer-implemented method involves: using the network interface to receive a live video stream from a remote computerized system, the live video stream comprising multiple frames; displaying the received live video stream on the display device; using the central processing unit to identify multiple semantically significant events in the received live video stream; associating each of the identified multiple semantically significant events with a respective keyframe; using the memory to store information on the identified multiple semantically significant events and the associated keyframes; and in response to detection of an instruction from a user, displaying a keyframe associated with one of the identified plurality of semantically significant events on the display device. The keyframe is displayed on the display device in addition to, or replacing the displayed received live video stream and the one of the identified plurality of semantically significant events is a past event previously displayed to the user as a part of the live video stream.

In accordance with another aspect of the embodiments described herein, there is provided a non-transitory computer-readable medium embodying a set of computer-executable instructions, which, when executed in a computerized system incorporating a central processing unit, a display device, a network interface and a memory, cause the computerized system to perform a method involving: using the network interface to receive a live video stream from a remote computerized system, the live video stream comprising multiple frames; displaying the received live video stream on the display device; using the central processing unit to identify multiple semantically significant events in the received live video stream; associating each of the identified multiple semantically significant events with a respective keyframe; using the memory to store information on the identified multiple semantically significant events and the associated keyframes; and in response to detection of an instruction from a user, displaying a keyframe associated with one of the identified plurality of semantically significant events on the display device. The keyframe is displayed on the display device in addition to, or replacing the displayed received live video stream and the one of the identified plurality of semantically significant events is a past event previously displayed to the user as a part of the live video stream.

In accordance with yet another aspect of the embodiments described herein, there is provided a computerized system incorporating a central processing unit, a display device, a network interface and a memory storing a set of instructions, the set of instructions including instructions for: using the network interface to receive a live video stream from a remote computerized system, the live video stream comprising multiple frames; displaying the received live video stream on the display device; using the central processing unit to identify multiple semantically significant events in the received live video stream; associating each of the identified multiple semantically significant events with a respective keyframe; using the memory to store information on the identified multiple semantically significant events and the associated keyframes; and in response to detection of an instruction from a user, displaying a keyframe associated with one of the identified plurality of semantically significant events on the display device. The keyframe is displayed on the display device in addition to, or replacing the displayed received live video stream and the one of the identified plurality of semantically significant events is a past event previously displayed to the user as a part of the live video stream.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
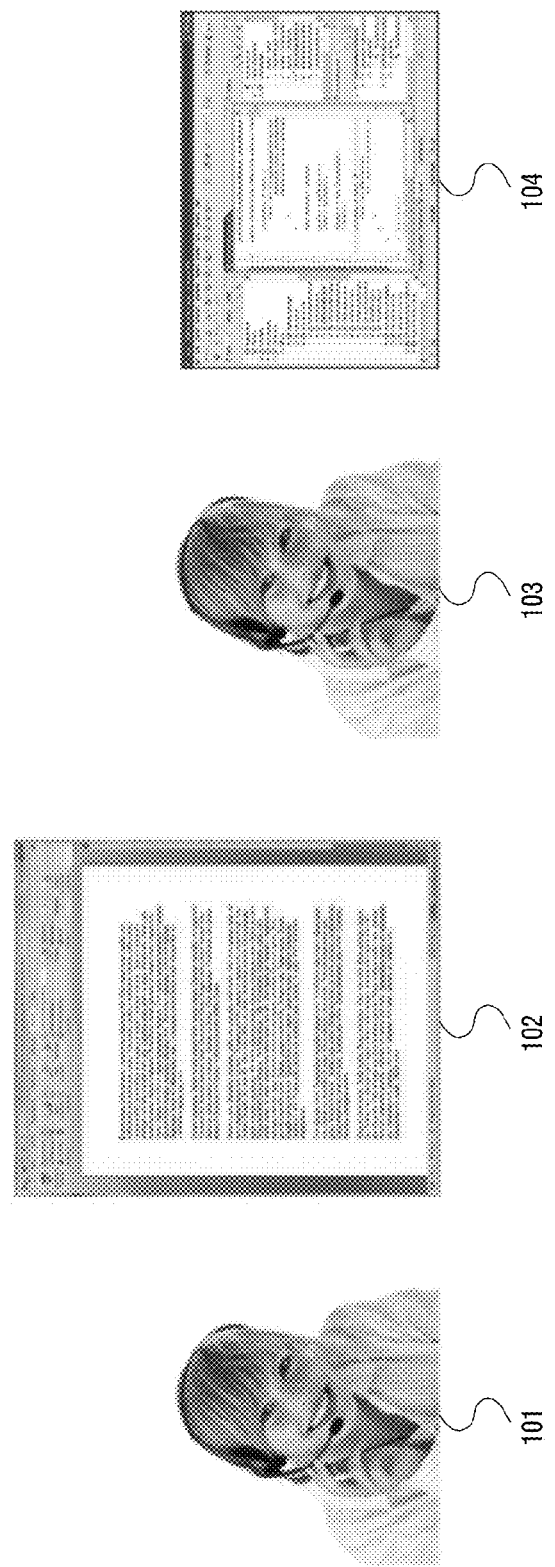
FIG. 1 illustrates an exemplary video conference scenario, wherein the participant shares different types of content.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Video chat tools allow people to stream a video of themselves, but recently many systems such as Skype, Google Hangout and others also enabled participants to share their screen, allowing them to quickly share a document, show a web site, or specific applications displayed on their computer screen, for example to demonstrate code editing. Embodiments described herein respond to the growing practice of millions of users (including the inventors every week or two) of conducting video meetings using lightweight solutions such as Skype or Google Hangout. Sharing documents or slides is ad-hoc and initiated spontaneously by participants using the tools' screen sharing capabilities. For example, when a participant needs to show a text document or a slide deck, she simply displays it on her desktop and starts sharing her screen for all to view. This contrasts with traditional video conferencing systems such as WebEx where users are provided with different streams to share data besides their video.

In accordance with one aspect of the inventive concepts, there are provided systems and methods that allow a conference participant to efficiently jump back into semantically meaningful parts of streams shared by their peers. As would be appreciated by persons of ordinary skill in the art, because the conference participants are engaged in real-time communication, it is important to provide tools that let them quickly jump back to past events, such as previously shown content, without requiring them to scrub through a standard video timeline.

Therefore, in accordance with one or more embodiments described herein, the conferencing system is configured to automatically find semantically meaningful events in the video conferencing stream(s). Types of such meaningful events may include, without limitation, scrolling pages, moving windows, typing of text, showing of faces, and the like. As would be appreciated by those of skill in the art, the inventive concepts are not limited to the described types of detected events or to any specific type or types of meaningful event or events. Additional types of events may be handled by properly configuring one or more modules of the conferencing system. Using the functionality provided by one or more embodiments described herein, a video conference participant can then easily go back to previous portions of the video conferencing stream, such as a previously shown document. In one or more embodiments, the participant is able to continue listening to the live audio of the conference while viewing the aforesaid previous portions of the stream. In one or more embodiments, novel user interface(s) are provided for advertising actions of each conference participant to their peers, allowing greater awareness and flow of communication.

Figure 2:
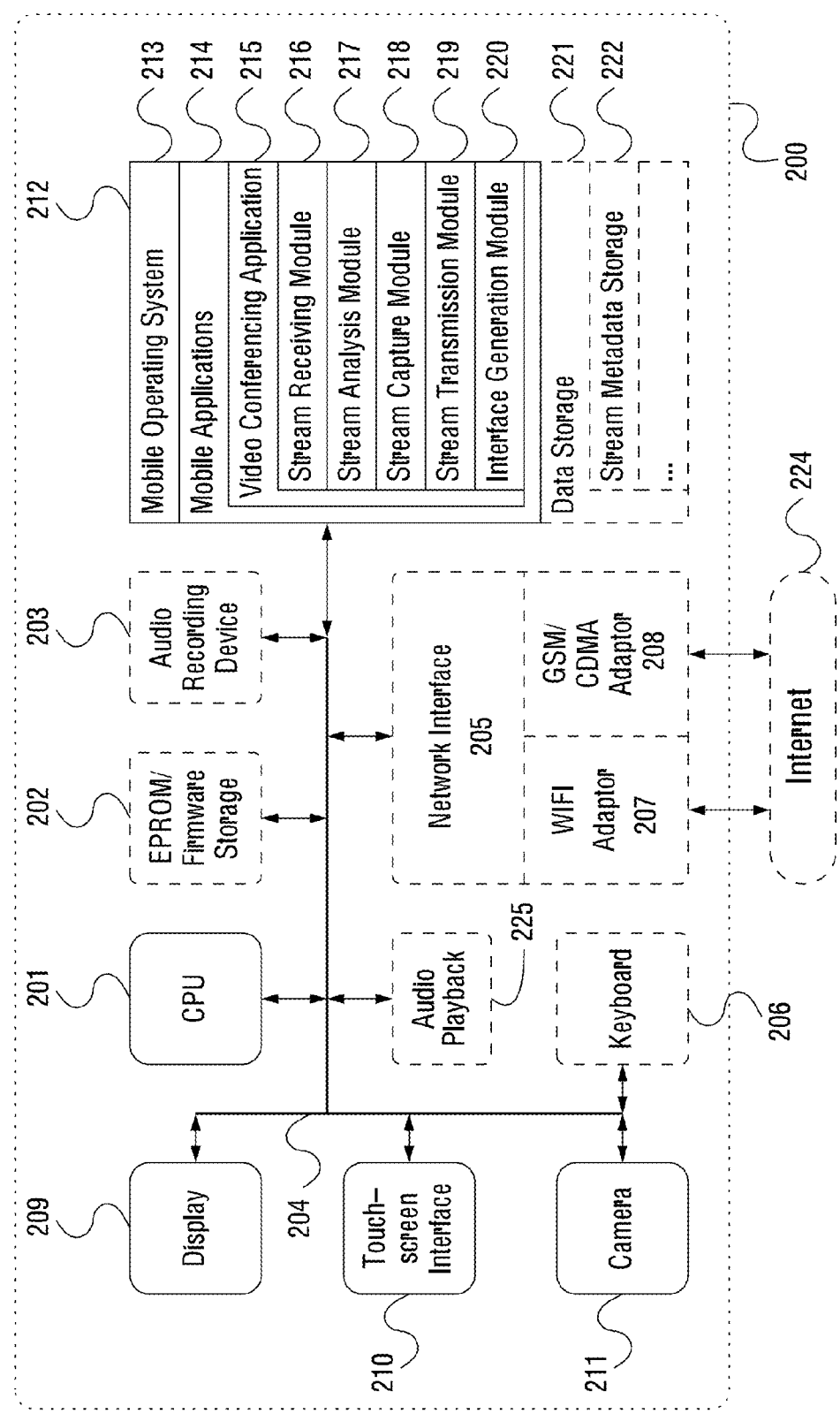
FIG. 2 illustrates an exemplary embodiment of a computerized system for real-time efficient navigation of multiple video conferencing streams.

FIG. 2 illustrates an exemplary embodiment of a computerized system 200 for real-time efficient navigation of multiple video conferencing streams. In one or more embodiments, the computerized system 200 may be implemented within the form factor of a mobile computing device, such as a smartphone, a personal digital assistant (PDA), or a tablet computer, all of which are available commercially and are well known to persons of skill in the art. In an alternative embodiment, the computerized system 200 may be implemented based on a laptop or a notebook computer. Yet in an alternative embodiment, the computerized system 200 may be an embedded system, incorporated into an electronic device with certain specialized functions, such as a web television receiving device configured to receive television broadcast digital video stream and display it to the user. Yet in an alternative embodiment, the computerized system 200 may be implemented as a part of an augmented reality head-mounted display (HMD) systems, also well known to persons of ordinary skill in the art.

The computerized system 200 may include a data bus 204 or other interconnect or communication mechanism for communicating information across and among various hardware components of the computerized system 200, and a central processing unit (CPU or simply processor) 201 coupled with the data bus 204 for processing information and performing other computational and control tasks. Computerized system 200 also includes a memory 212, such as a random access memory (RAM) or other dynamic storage device, coupled to the data bus 204 for storing various information as well as instructions to be executed by the processor 201. The memory 212 may also include persistent storage devices, such as a magnetic disk, optical disk, solid-state flash memory device or other non-volatile solid-state storage devices.

In one or more embodiments, the memory 212 may also be used for storing temporary variables or other intermediate information during execution of instructions by the processor 201. Optionally, computerized system 200 may further include a read only memory (ROM or EPROM) 202 or other static storage device coupled to the data bus 204 for storing static information and instructions for the processor 201, such as firmware necessary for the operation of the computerized system 200, basic input-output system (BIOS), as well as various configuration parameters of the computerized system 200.

In one or more embodiments, the computerized system 200 may incorporate a display device 209, which may be also coupled to the data bus 204, for displaying various information to a user of the computerized system 200. In an alternative embodiment, the display device 209 may be associated with a graphics controller and/or graphics processor (not shown). The display device 209 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 209 may be incorporated into the same general enclosure with the remaining components of the computerized system 200. In an alternative embodiment, the display device 209 may be positioned outside of such enclosure.

In one or more embodiments, the display device 209 may be implemented in a form of a projector or a mini-projector configured to project information on various objects, such as glasses worn by the user. In one or more embodiments, the display device 209 may be configured to be mountable on the head of the user. To this end, the display device 209 may be provided with suitable mounting hardware (not shown).

In one or more embodiments, the computerized system 200 may further incorporate an audio playback device 225 connected to the data bus 204 and configured to play various audio files and streams, such as MPEG-3 files, or audio tracks of various video files, such as MPEG-4 files, well known to persons of ordinary skill in the art. To this end, the computerized system 200 may also incorporate waive or sound processor or a similar device (not shown). In the described specific embodiments, the audio playback device 225 is configured to play to the user the live audio stream of the video conference.

In one or more embodiments, the computerized system 200 may incorporate one or more input devices, such as a touchscreen interface 210 for receiving tactile commands of the video conference participants, a camera 211 for acquiring still images and video of the conference participant and/or various objects, as well as a keyboard 206, which all may be coupled to the aforesaid data bus 204 for communicating information, including, without limitation, images and video, as well as user command selections to the processor 201. In an alternative embodiment, input devices may include a system for tracking eye movements of the user (not shown), which may be used to indicate to the computerized system 200 the command selection made by the video conference participant.

In one or more embodiments, the computerized system 200 may additionally include an audio recording device 203 configured to record audio signal, such as speech of the conference participant and, optionally, convert the recorded audio signal into textual representation using, for example OCR algorithms well known to persons of skill in the art.

In one or more embodiments, the computerized system 200 may additionally include a communication interface, such as a network interface 205 coupled to the data bus 204. The network interface 205 may be configured to establish a connection between the computerized system 200 and the Internet 224 using at least one of WIFI interface 207 and the cellular network (GSM or CDMA) adaptor 208. The network interface 205 may be configured to provide a two-way data communication between the computerized system 200 and the Internet 224. The WIFI interface 207 may operate in compliance with 802.11a, 802.11b, 802.11g and/or 802.11n protocols as well as Bluetooth protocol well known to persons of ordinary skill in the art. In an exemplary implementation, the WIFI interface 207 and the cellular network (GSM or CDMA) adaptor 208 send and receive electrical or electromagnetic signals that carry digital data streams representing various types of information.

In one or more embodiments, the Internet 224 typically provides data communication through one or more sub-networks to other network resources. Thus, the computerized system 200 is capable of accessing a variety of network resources located anywhere on the Internet 224, such as remote media servers, web servers, other content servers as well as other network data storage resources. In one or more embodiments, the computerized system 200 is configured send and receive messages, media and other data, including application program code, through a variety of network(s) including Internet 224 by means of the network interface 205. In the Internet example, when the computerized system 200 acts as a network client, it may request code or data for an application program executing on the computerized system 200. Similarly, it may send various data or computer code to other network resources.

In one or more embodiments, the computerized system 200 uses the network interface 205 to access, via the Internet 224, computerized systems of other video conference participants and to send and receive video conferencing streams respectively to and from such other video conference participants.

In one or more embodiments, the functionality described herein is implemented by computerized system 200 in response to processor 201 executing one or more sequences of one or more instructions contained in the memory 212. Such instructions may be read into the memory 212 from another computer-readable medium. Execution of the sequences of instructions contained in the memory 212 causes the processor 201 to perform the various process steps described herein. In alternative embodiments, hard-wired circuitry may be used in place of or in combination with software instructions to implement the embodiments invention. Thus, embodiments of the invention are not limited to any specific combination of hardware circuitry and software.

The term "computer-readable medium" as used herein refers to any medium that participates in providing instructions to processor 201 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 101 for execution. For example, the instructions may initially be carried on a magnetic disk from a remote computer. Alternatively, a remote computer can load the instructions into its dynamic memory and send the instructions over the Internet 224. Specifically, the computer instructions may be downloaded into the memory 212 of the computerized system 200 from the foresaid remote computer via the Internet 224 using a variety of network data communication protocols well known in the art.

In one or more embodiments, the memory 212 of the computerized system 200 may store any of the following software programs, applications or modules:

1. Operating system (OS) 213, which may be a mobile operating system for implementing basic system services and managing various hardware components of the computerized system 200. Exemplary embodiments of the operating system 213 are well known to persons of skill in the art, and may include any now known or later developed mobile operating systems.

2. Mobile applications 214 may include, for example, a set of software applications executed by the processor 201 of the computerized system 200, which cause the computerized system 200 to perform certain predetermined functions, such as acquire digital images or video of the video conference participant using the camera 211, display one or more video conferencing streams using the display device 209 and/or perform playback of the live audio of the video conference using the audio playback device 225. In one or more embodiments, the mobile applications 214 may include an inventive video conferencing application 215, described in detail below.

3. Data storage 221 may be used, for example, for storing video streams used in connection with the inventive video conferencing application 215 as well as various metadata associated with the aforesaid video conferencing streams, which may be stored in the stream metadata storage 222. In one or more embodiments, such metadata may include information on the semantically meaningful events identified in the received video conferencing stream(s). In one or more embodiments, additional information stored in the data storage 221 may include textual transcript data representing the audio stream of the conference. In addition, other data received by the computerized system 200 over the Internet 224 may also be stored in the data storage 221.

In one or more embodiments, the inventive video conferencing application 215 may incorporate a graphical user interface generation module 220 configured to generate an inventive graphical user interface for easy navigation within video conferencing stream(s) displayed on the display device 209 of the computerized system 200. The generated graphical user interface may be configured to display to the user video conferencing stream(s) shared by other users, to display to the user video conferencing stream sharing history based on the semantically meaningful events identified in the received video conferencing stream(s), to receive from the user navigation commands in relation to the semantically meaningful events identified in the received video conferencing stream(s) and included in the sharing history and, in response, to display information associated with the aforesaid semantically meaningful event(s).

The inventive video conferencing application 215 may further include a video stream receiving module 216 for receiving shared video conferencing stream(s) from computer systems of other video conference participants via the Internet 224, a video stream analysis module 217 for performing analysis of the received video conferencing stream(s) and automatically identifying semantically meaningful events in the received video conferencing stream(s), a video stream capture module 218 for generating user's video conferencing stream for sharing with other conference participants and a video stream transmission module 219 for transmitting the generated user's video conferencing stream shared by the user to the computerized systems used by other video conference participants via the Internet 224. In one or more embodiments, the video stream analysis module 217 is configured to perform image analysis of each video frame in the video conferencing stream.

Figure 3:
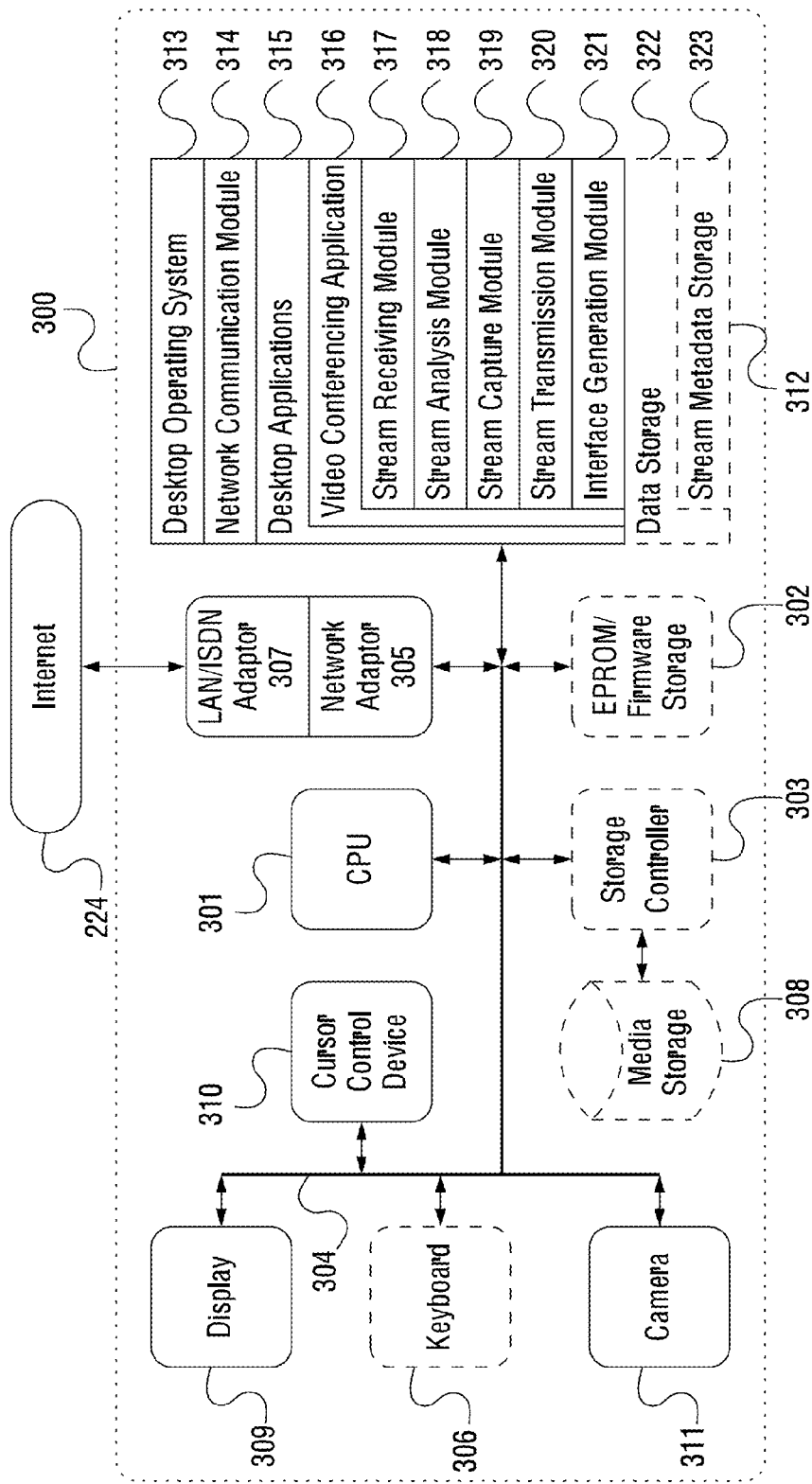
FIG. 3 illustrates an alternative exemplary embodiment of a computerized desktop system for real-time efficient navigation of multiple video conferencing streams.

FIG. 3 illustrates an alternative exemplary embodiment of a computerized desktop system 300 for real-time efficient navigation of multiple video conferencing streams. In one or more embodiments, the computerized desktop system 300 may incorporate a data bus 304, which may be substantially similar and may perform substantially similar functions as the data bus 204 of the computerized system 200 illustrated in FIG. 2. In various embodiments, the data bus 204 may use the same or different interconnect and/or communication protocol as the data bus 204. The one or more processors (CPUs) 301, the network adaptor 305, the EPROM/Firmware storage 302, the display device 309 and the keyboard 306 of the computerized desktop system 300 may be likewise substantially similar to the respective processor 201, the network interface 205, the EPROM/Firmware storage 202, the display device 209 and the keyboard 206 of the computerized system 200, except that the former components are deployed in a desktop platform configuration. In various implementations, the one or more processor 301 may have substantially increased processing power as compared with the processor 201.

In addition to the input device 306 (keyboard), the computerized desktop system 300 may additionally include a cursor control device 310, such as a mouse, a trackball, or cursor direction keys for communicating direction information and command selections to processor 301 and for controlling cursor movement on the display device 309. This input device typically has two degrees of freedom in two axes, a first axis (e.g., x) and a second axis (e.g., y), that allows the device to specify positions in a plane.

The LAN/ISDN adaptor 307 of the computerized desktop system 300 may be implemented, for example, using an integrated services digital network (ISDN) card or a modem to provide a data communication connection to a corresponding type of telephone line, which is interfaced with the Internet 224 using Internet service provider's hardware (not shown). As another example, the LAN/ISDN adaptor 307 may be a local area network interface card (LAN NIC) to provide a data communication connection to a compatible LAN and the Internet 224. To store various media files, the computerized desktop system 300 may be provided with a media storage 308 connected to the data bus 304 by means of a storage controller 303.

In one or more embodiments, the memory 312 of the computerized desktop system 300 may store any of the following software programs, applications or modules:

1. Desktop operating system (OS) 313, which may be an operating system for implementing basic system services and managing various hardware components of the computerized desktop system 300. Exemplary embodiments of the desktop operating system 313 are all well known to persons of skill in the art, and may include any now known or later developed operating systems.

2. Network communication module 314 may incorporate, for example, one or more network protocol stacks which are used to establish a networking connection between the computerized desktop system 300 and the various network entities of the Internet 224, such as the computerized system 200, using the network adaptor 305 working in conjunction with the LAN/ISDN adaptor 307.

3. Desktop applications 315 may include, for example, a set of software applications executed by one or more processors 301 of the computerized desktop system 300, which cause the computerized desktop system 300 to perform certain predetermined functions or tasks. In one or more embodiments, the desktop applications 315 may include an inventive video conferencing application 316, described in detail below. In one or more embodiments, the inventive video conferencing application 316 may incorporate a graphical user interface generation module 321 configured to generate an inventive graphical user interface for easy navigation within video conferencing stream(s) displayed on the display device 309 of the computerized system 300. The inventive video conferencing application 316 may further include a video stream receiving module 317 for receiving shared video conferencing stream(s) from computer systems of other video conference participants via the Internet 224, a video stream analysis module 318 for performing analysis of the received video conferencing stream(s) and automatically identifying semantically meaningful events in the received video conferencing stream(s), a video stream capture module 319 for generating user's video conferencing stream for sharing with other conference participants and a video stream transmission module 320 for transmitting the generated user's video conferencing stream shared by the user to the computerized systems used by other video conference participants via the Internet 224.

In one or more embodiments, the operation of the aforesaid modules of the inventive video conferencing application 316 is substantially similar to the operation of the respective modules of the video conferencing application 215 deployed on the computerized system 200 and will be described in detail below.

4. Data storage 323 may be used, for example, for storing video streams used in connection with the inventive video conferencing application 316 as well as various metadata associated with the aforesaid video conferencing streams, which may be stored in the stream metadata storage 323. In one or more embodiments, such metadata may include information on the semantically meaningful events identified in the received video conferencing stream(s). In one or more embodiments, additional information stored in the data storage 322 may include textual transcript data representing the audio stream of the conference. In addition, other data received by the computerized system 300 over the Internet 224 may also be stored in the data storage 322.

The operation of the various software modules deployed on the computerized system 200 and the computerized desktop system 300 will now be described in detail. To enhance user experience during video conferences, the video stream analysis module 217 (318) is configured to automatically analyze video streams to detect certain types of events in real time. The information on the detected events is stored in the stream metadata storage module 222 (323). This information is subsequently used to enable the conference participants to quickly go back in time and efficiently review events like shared slides, text editing, scrolling, desktop activity, and the like. Thus, in one or more embodiments, the computerized system 200 and the computerized desktop system 300 enable a user to rapidly jump back within a live stream and reach semantically meaningful segments such as a the sharing of a slide, a shot in which a web site is shown, or a shot showing a peer's PDF document.

Real-Time Content Type Detection of Frame and Shots

In one or more embodiments, the video conference stream received by the video stream receiving module 216 (317) comprises a set of video frames, such as video frames formatted in accordance with HTML5 standard, which is well known to persons of ordinary skill in the art. The video stream analysis module 217 (318) utilizes one or more algorithms for real-time classification of the incoming video frames, such as HTML5 video frames, into sets of semantically meaningful content types. Exemplary types of content occurring during typical screen sharing sessions in a video conference include, without limitation, the following:

1. Text content, including, without limitation, presentation slides containing text, text (e.g. PDF viewer, Word Document) and text editing (e.g. live coding session).

2. Text scroll content, including, without limitation, scrolled content (e.g. web page demo, Word, PDF viewer).

3. Face content including, without limitation, images or video of a human face or faces.

4. Desktop content, including, without limitation, visual representation of a computer desktop and/or computer desktop activity.

5. Mouse activity, including, without limitation, mouse and/or pointer activity.

It should be noted that in one or more embodiments, a single video frame may be labeled with multiple frame (content) types. For example, text and text scroll content labels may be assigned to a frame being scrolled that shows a document with text. In another example, a series of frames could be labeled as "text" but may also include detected mouse activity taking place while the user is manipulating text. In one or more embodiments, the video stream analysis module 217 (318) may give more importance to frames showing text where there also was mouse activity present, because the presence of the mouse activity indicates that the user wanted to emphasize something in this text passage. Furthermore, the described techniques are not limited only to the HTML5 video frames described herein and the video frames formatted in accordance with any other suitable format may likewise be used in connection with the described video frame analysis.

In one or more embodiments, the computations necessary for the classification of the video frame(s) are performed in real-time using the video stream analysis module 217 (318). In one or more embodiments, the video conferencing application 215 (316) is deployed in connection with a web browser (not shown) executing on the computerized system 200 and/or the computerized desktop system 300. Specifically, the video conferencing application 215 (316) may be implemented as an add-on or plug-in operating in connection with the aforesaid web browser. The video stream analysis module 217 (318) may, in turn, be also deployed in connection with the aforesaid web browser installed on the computerized system 200 and/or the computerized desktop system 300.

In one or more embodiments, if the computerized system 200 does not have sufficient processing power to perform the independent analysis of the video conferencing stream, the computerized system 200 is configured to receive the results of video frame analysis of computing devices of other participants, such as the computerized desktop system 300 shown in FIG. 3. In one or more embodiments, this can be done, for example, via RTCPeerConnection messaging channel for enabling real-time communication between applications, such as web browsers, well known to persons of ordinary skill in the art. In one or more embodiments, an exemplary RTCPeerConnection message may indicate, for example, that frame at a specific time is of a specific type, such as a slide frame. It should be noted that the invention is not limited to the aforesaid RTCPeerConnection messaging channel and any other suitable messaging protocol may also be employed for relaying frame type information between computerized systems used by different video conference participants. As would be appreciated by those of ordinary skill in the art, in the aforesaid embodiment, no frame analysis computation is required from the specific computerized system 200, but only storage of the incoming frames up to a time window, for example 5 minutes.

Figure 4:
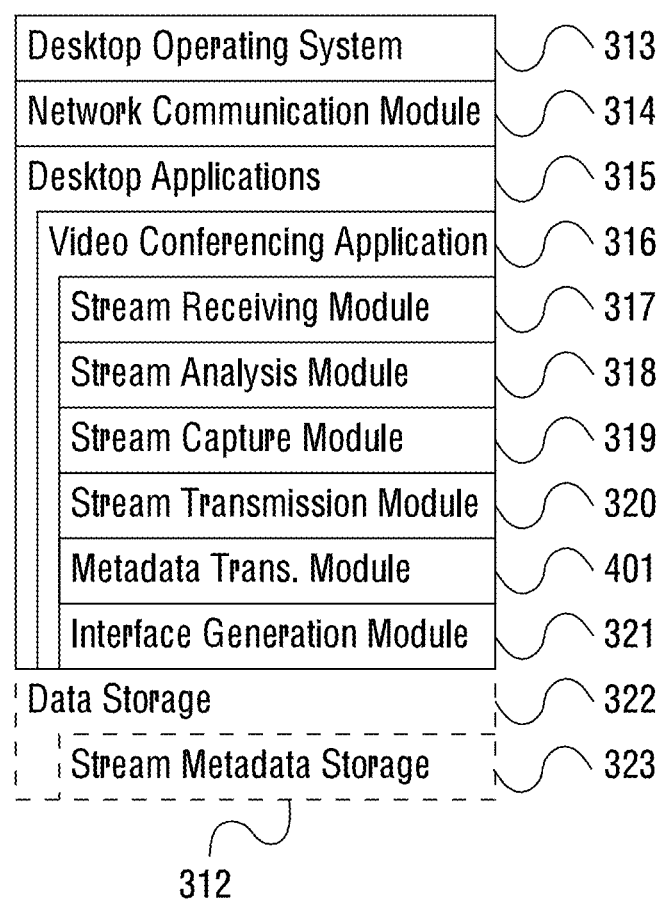
FIG. 4 illustrates an alternative exemplary embodiment of the memory unit of the computerized desktop system, wherein the video conferencing application is configured to transmit the results of video frame analysis (video stream metadata) performed by the stream analysis module to other computerized systems.
Figure 5:
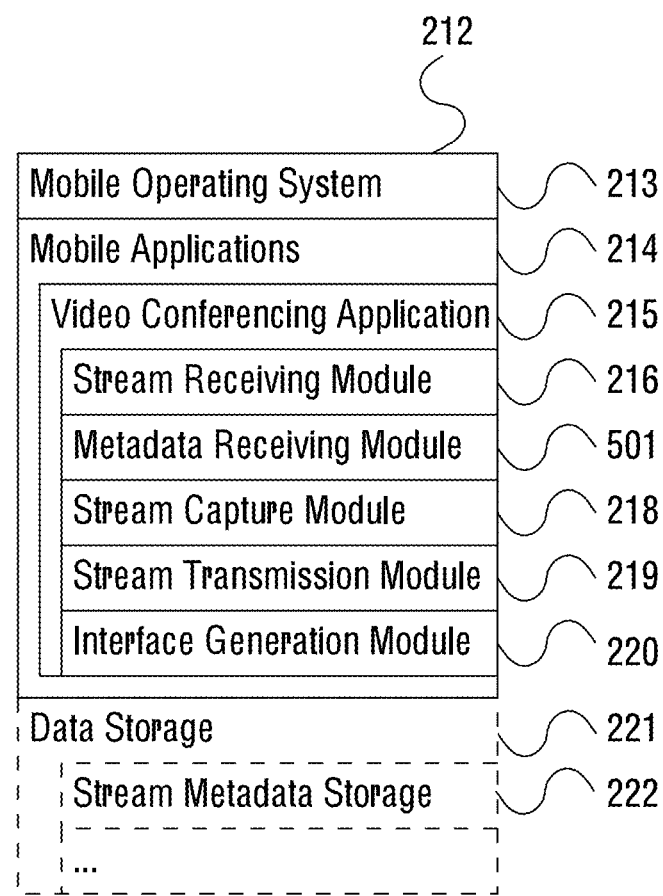
FIG. 5 illustrates an alternative exemplary embodiment of the memory unit of the computerized mobile system, wherein the video conferencing application is configured to receive the results of video frame analysis from other computerized systems.

FIG. 4 illustrates an alternative exemplary embodiment of the memory unit 312 of the computerized desktop system 300, wherein the video conferencing application 316 is configured to transmit the results of video frame analysis (video stream metadata) performed by the stream analysis module 318 to other computerized systems, such as the computerized mobile system 200. To this end, the video conferencing application 316 shown in FIG. 4 is provided with a metadata transmission module 401, which is configured to transmit the results of video frame analysis to other computer systems. On the other hand, FIG. 5 illustrates an alternative exemplary embodiment of the memory unit 212 of the computerized mobile system 200, wherein the video conferencing application 215 is configured to receive the results of video frame analysis from other computerized systems, such as the aforesaid computerized desktop system 300. The aforesaid metadata receiving operation is performed using a metadata receiving module 501.

In one or more embodiments, the speed of the computations necessary for video frame analysis is optimized by scaling down the original video feed before computing frame differences between a new and a prior frame and applying the steps described below if the new frame is different from the prior frame. As would be appreciated by those of skill in the art, the aforesaid scaling down results in substantial reduction of the number of necessary processor cycles when conference participants show desktops, documents or text editors.

Figure 6:
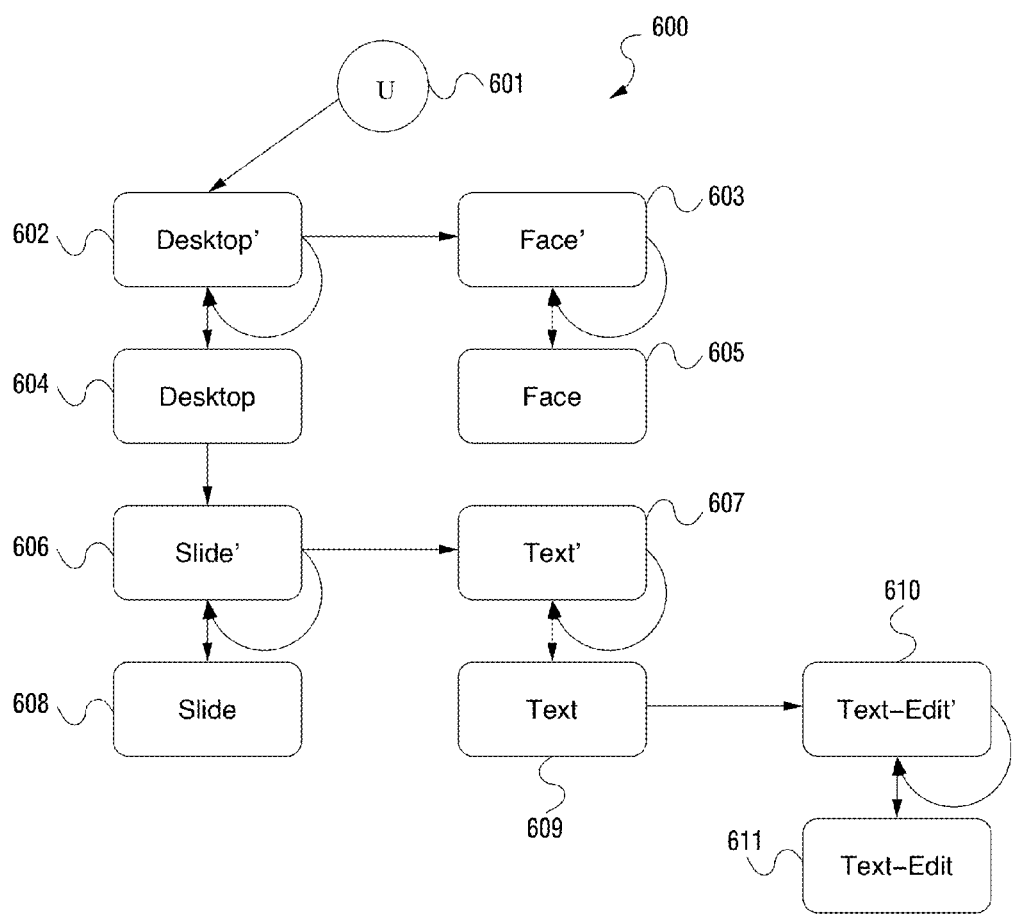
FIG. 6 illustrates an exemplary embodiment of a process for classifying frames in a video conferencing streams.

FIG. 6 illustrates an exemplary embodiment of a process 600 for classifying frames in a video conferencing streams. As shown in FIG. 6, all frames are initially uncategorized, see the uncategorized state 601. Each frame is then categorized as either a potential desktop frame (desktop' state 602) or a potential face frame (face' state 603). After a sufficient number of frames have been accumulated, the respective states 602 and 603 move from the potential states marked in FIG. 6 with the prime superscript (602 and 603) to respective actual states (with no prime superscript) 604 and 605, respectively. The aforesaid sufficient number of frames could be a predetermined number set with the configuration parameters of the stream analysis module 217 (318).

Similarly, desktop frames are further initially categorized as slide' (with prime superscript) 606 or text' (with prime superscript) 607, with subsequent actual (final) classification states 608 and 609 (with no prime superscript), respectively. The text frames can be further initially and finally labeled as text edit 610 (with prime superscript) and 611 (with no prime superscript), respectively. Whenever a determined type of a set of frames of a predetermined size disagrees with the current state, the state reverts back to the parent non-prime state (thus, if the current state is slide 608, and a set of non-slide frames arrives, the state will fall back to desktop 604 before reverting back to uncategorized 601).

In one or more embodiments, in addition to the video conferencing stream analysis performed by the stream analysis module 217 (318), metadata of the user's current input source is used for the initial classification of the video frames in the conferencing stream. For example, such source metadata could be used to easily distinguish between a feed from the camera 211 (311) and a computer desktop activity. However, as would be appreciated by those of skill in the art, within certain applications, such as web applications, metadata that could be used to further classify screen activity is not available. Accordingly, in one or more embodiments, the video conferencing application 215 (316) is provided to users as a downloadable application that can be configured to detect and stream metadata about each source application used during the video conference.

Detection of Text, Slide and Text Editing

In one or more embodiments, to detect video frames involving text slides or text editing, the stream analysis module 217 (318) is configured to compute connected components and determine their bounding boxes using, for example, the well known in the art algorithm described in John Adcock, Matthew Cooper, Laurent Denoue, Hamed Pirsiavash, and Lawrence A. Rowe, TalkMiner: A Lecture Webcast Search Engine. Proc. ACM Multimedia 2010, Oct. 25, 2010.

In one or more embodiments, subsequently to the aforesaid computing of the connected components and determining their bounding boxes, the video frames are labeled as follows:

1. as slides, if the bounding boxes are sufficiently big (using, for example, the heuristics or classifier described in the aforesaid last publication, and they remain consistent across several frames;

2. as text, if the determined bounding boxes don't move across several frames, such as when a person shows a page of a PDF in Acrobat Reader; and 3. as text edit, if new bounding boxes are found in background areas from previous frames.

While, in one or more embodiments, several frames can be classified as text edit, it is useful for navigational purposes to pick one representative frame. Thus, in one embodiment, the stream analysis module 217 (318) picks the last frame in a sequence of text edit. It will typically be the frame showing the end of a line being typed instead of the frame where a text line is not complete yet, thus providing the user with a meaningful keyframe. In alternative embodiments, other well-known in the art keyframe detection techniques for video keyframing, where the middle or a representative frame is used as keyframe, could also be used.

Detection of Scrolled Document (Scrolled Text)

In one or more embodiments, the stream analysis module 217 (318) is configured to detect the amount of scroll as the average column shift between two frames. Scroll frame type is assigned if the amount of scroll detected as described herein is non-zero. It should be noted that often a frame or span of frames might be classified as both text edit and scroll because it's typical that content shifts vertically when a user types new text lines into a text editor.

In one or more embodiments, a series of frames so detected as scroll are packed into a single Animated GIF, which will subsequently be useful to avoid crowding the user interface with meaningless frames and still provide to the video conference participants dynamic visual context from the original frame sequence.

Face Detection

In one or more embodiments, the stream analysis module 217 (318) is configured to perform face detection using well-known real-time software face detectors and/or trackers, such as algorithms readily available for the Javascript environment. In one embodiment, the ratio of the face size to the size of the frame is utilized to determine whether a frame represents a face. In one or more embodiments, the middle frame in the face frame sequence is selected as the keyframe for inclusion in the navigation history. In another embodiment, the stream analysis module 217 (318) is configured to detect when a video conference participant switches from sharing his webcam to sharing his screen. In this case, the stream analysis module 217 (318) simply labels the frames as face unless the participant switches back to sharing his display screen.

Detection of Computer Desktop Activity

In one or more embodiments, the stream analysis module 217 (318) is configured to use the computer desktop as the default frame class to speed up the classification. As would be appreciated by persons of skill in the art, the desktop activity can also be segmented using regions of interest. It is typical for a video conference participant to click on menu items to open them, or buttons to close dialog boxes. Accordingly, in one embodiment, the stream analysis module 217 (318) incorporates a fast region detector configured to recognize rectangular areas on a frame and to track their presence over subsequent frames. In one embodiment, the desktop activity is recognized as a series of box areas appearing and disappearing. A keyframe is then chosen as the frame showing a box region before it disappears or after it has moved (e.g. a Window has been moved over the desktop) or its size has changes (when, for example, the user has finished resizing a window), similarly to the above method of selection of the keyframe to represent a text edit span of frames.

Detecting and Enhancing Mouse Motion

As would be appreciated by persons of skill in the art, it is also very common during a video conference for a participant to use his mouse cursor to circle over areas of interest to illustrate a particular point. Therefore, in one or more embodiments, the stream analysis module 217 (318) is configured to detect the location of the user's mouse cursor on the screen using, for example, the algorithm for an automatic detection of mouse in video stream described in U.S. Pat. No. 8,117,544 and/or the algorithm for using PowerPoint or the operating system to get the actual cursor location described in U.S. Patent Application Publication No. 2009/0113278.

In one or more embodiments, the mouse cursor is located by computing differenced between video frames in a video frame sequence, which is referred to herein as frame differencing. In accordance with one aspect, the stream analysis module 217 (318) is configured to compute the difference between two successive frames A and B as frame D. In one embodiment, the frames A and B are binarized using a fast edge detector described, for example, in Laurent Denoue, Scott Carter, Matthew Cooper, and John Adcock, Real-time Direct Manipulation of Screen-based Videos Proc. IUI 2013, Mar. 19, 2013.

As would be appreciated by persons of skill in the art, the resulting frame D represents the absolute difference between frames A and B. Frame D has pixel values of 1 (one) if the corresponding pixel in frame A is different from frame B, and 0 (zero) otherwise. In one embodiment, to detect the mouse activity, the following algorithm is used. Specifically, the stream analysis module 217 (318) finds x and y coordinates of the mouse pointer as the corresponding position in frame D where: $D(x-1,y)$ is 1 (one) and $D(x,y)$ is 1 (one). As would be appreciated by persons of skill in the art, this means that two pixels on the horizontal Y are found to have non-zero values. It should be noted that in one embodiment using just one pixel is usually not sufficient for the above-described mouse pointer detection algorithm to work, as it tends to detect other locations on frame D that do not correspond to mouse activity. Thus, in one embodiment, the mouse location is determined based on a minimal number of pixels in frame D, which exceeds a predetermined threshold number.

It should be further noted that the concepts described herein are not limited to any specific mouse or pointer detection algorithm(s) and any other more complex methods for mouse/pointer detection can be utilized, including well-known in the art methods based on a template matching of a normal appearance of the mouse pointer and the content of the video frame. Thus, the described specific mouse pointer detection algorithm should not be construed in the limiting sense.

In one or more embodiments, once the mouse position is determined, the stream analysis module 217 (318) is configured to determine whether a significant (semantically meaningful) event has taken place and the corresponding keyframe should be kept for future use. In one or more embodiments, the stream analysis module 217 (318) is configured to treat as significant the following exemplary events: 1) the mouse is moving for several seconds over a region (this could occur when a user was circling over an important part of his or her screen during screen sharing); or 2) the mouse moves out from a region, goes into another region and stops there (not necessarily moving) (this could occur when the user moves the pointer to reach a menu or click a button on his or her screen). It should be noted that the invention is not limited to the described exemplary types of significant events and the stream analysis module 217 (318) could be appropriately configured to treat as significant any other suitable user actions. In one or more embodiments, when the significant user event is detected, such as when the cursor is detected to move around an area within the frame for several seconds, the stream analysis module 217 (318) classifies this frame as a mouse activity.

In one or more embodiments, the video conferencing application 215 (316) is deployed on a web browser that provides an option to include the mouse-pointer in the video stream of a screen. An example of a browser offering such functionality is Google Chrome, which gives developers access to media constraints when setting up getUserMedia resource.

In one or more embodiments, frames labeled as mouse activity are dynamically grouped into clusters and a new keyframe is added to the history of kept frames when a new cluster is found. Furthermore, as would be appreciated by those of skill in the art, the detection of mouse pointers is extremely useful because screens shared during a video conference are often scaled down to limit bandwidth and it is important for remote peers to clearly see where a peer is moving around on his or her screen. It's similar to using gestures and pointing at documents in face to face meetings. Accordingly, in real-time, the video conferencing application 215 (316) automatically "highlights" the remote peer's mouse pointer to enhance the experience for all the peers.

Exemplary User Interface for Navigating Streams

In one or more embodiments, the video conferencing application 215 (316) incorporates the graphical user interface generation module 220 (321), which is configured to generate one or more user interfaces enabling users to navigate into the past portions of video conferencing streams. Exemplary embodiments of these interfaces will now be described in detail.

1. Text-Chat like Interface. Text chats typically append new text below existing chat messages, and let participants easily scroll up to rewind to previous chat messages. Similarly, in one or more embodiments, incoming video stream frames that have been classified by the stream analysis module 217 (318) as text scroll are reviewed using direct manipulation as described, for example, in Laurent Denoue, Scott Carter, Matthew Cooper, and John Adcock Real-time Direct Manipulation of Screen-based Videos Proc. IUI 2013, Mar. 19, 2013 and in U.S. patent application Ser. No. 13/939,081.

2. Standard Timeline-like Interface. In another embodiment, the interface generation module 220 (321) of the video conferencing application 215 (316) generates a timeline user interface well known in the art that lets conference participants go back in time. In one embodiment, instead of showing the video, the system shows them the corresponding keyframes found at these times.

3. Direct Video Scrubbing Interface. In yet another embodiment, the user interface generation module 220 (321) generates a user interface providing a way for participants to jump into past frames by issuing an appropriate instruction directed to the user interface, such as by simply swiping backwards over the video stream of interest of one of the other participants or her own using a gesture on a touch screen, clicking and dragging left using a mouse pointer or simply pressing left arrow key or by pressing and holding on a provided "back" button or by pressing on the left part of the video stream. In response, the video conferencing application 215 (316) shows frames from the past that match one of the above-described content types including, without limitation, slide, text scroll, and the like. As would be appreciated by those of skill in the art, this mode allows for fast skimming into past frames.

In one or more embodiments, if the user wants to navigate to individual frames, the generated user interface is configured to detect user's instruction, such as tapping on the touchscreen 209/210, clicking the provided "back" button or clicking on the left side of the stream and, in response, the video conferencing application 215 (316) is configured to skip to previous detected frames one at a time.

Exemplary Interfaces to Support Navigation Awareness

Figure 7:
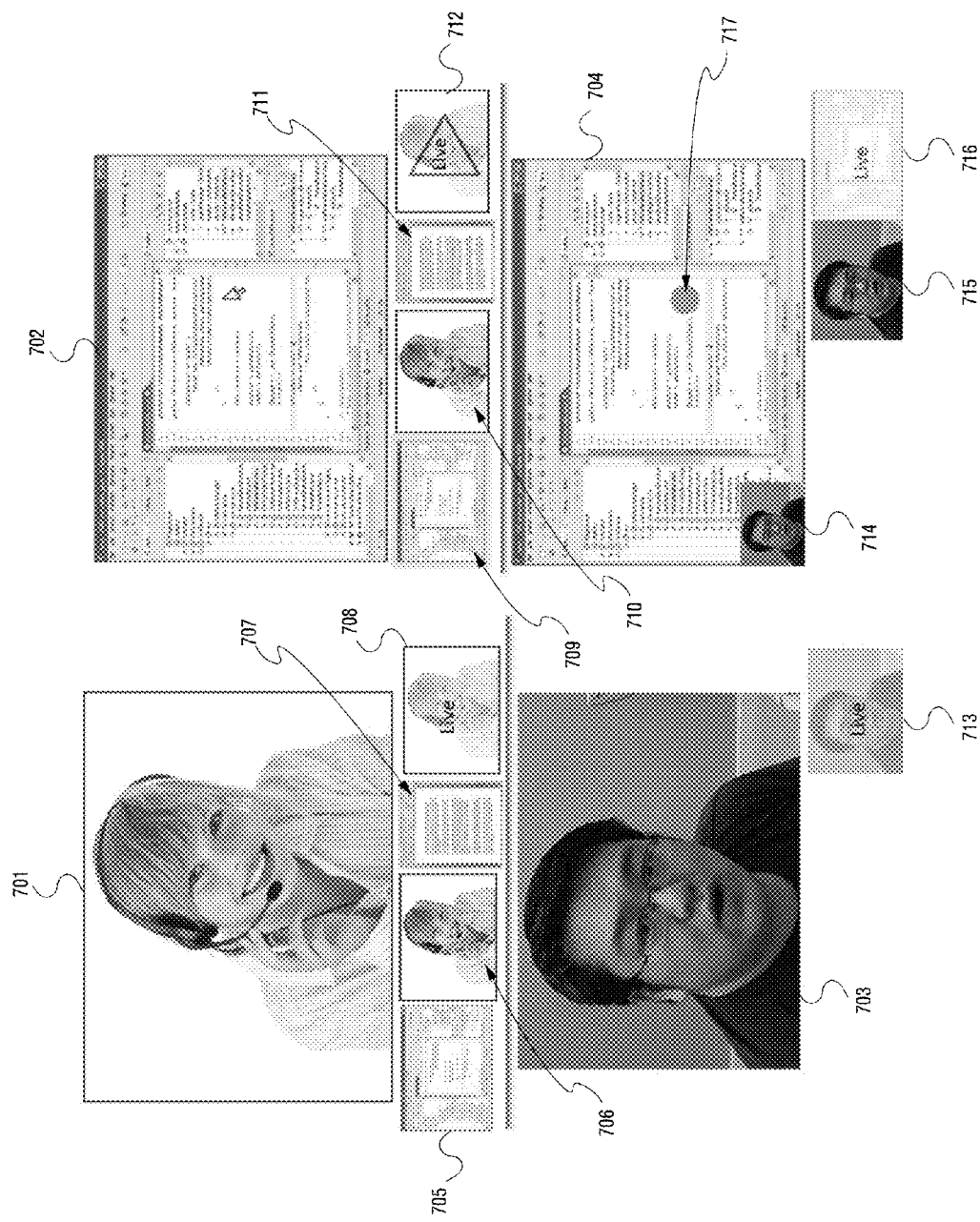
FIG. 7 illustrates an exemplary embodiment of a graphical user interface generated by the user interface generation module of the video conferencing application.

FIG. 7 illustrates an exemplary graphical user interface generated by the aforesaid user interface generation module 220 (321) of the video conferencing application 215 (316). The shown exemplary user interface is generated for a video conference including two imaginary participants named John and Mary. John's view of Mary appears along the top of the figure in panels 701 and 702, which represent two different points in time. John sees Mary's live webcam 701 as well as a historical list of detected screen shots represented by thumbnails 705, 706, 707 and 708, that she has shared in her conference stream. On the right side of the figure, the views in the panel 702 are updated after John selects a keyframe, for example keyframe 709, from among keyframes 709, 710, 711 and 712 to review and discuss. The selected keyframe 709 shows Mary's earlier use of a code editor, which is displayed in the panel 702.

Mary's view of John appears in the lower panels 703 and 704, which also represent two different time points. Similarly, Mary sees John's webcam 703, but because John has not shared his screen, Mary sees nothing other than his live webcam keyframe in her historical view, 713. John then decides to select a previously shared view of Mary's code editor (thumbnail 709) from the history bar 709, 710, 711 and 712 and sees it expanded in his view 702. John's historical view along the bottom reflects that he is looking at the code editor, see thumbnail 716, while the thumbnail 715 indicates previous keyframe in John's stream (his face). In one or more embodiments, this change only affects the video stream while the audio stream remains live. Meanwhile, Mary's view can optionally change to show the content being referred to, 704, as well Mary as that participant's mouse location indicated by red dot 717.

I one or more embodiments, as user Mary navigates back into the stream of participant John, she can choose to "advertise" what she sees to the other participants or only one or more participants. This function may be implemented using a number of options:

1. In one embodiment, the video conferencing application 215 (316) replaces Mary's stream to show what she is reviewing, so that other participants know immediately that Mary is looking at past frames. John's name can be overlaid too so people know whose stream is being manipulated by Mary.

2. In another embodiment, the video conferencing application 215 (316) replaces John's stream to show what Mary is reviewing in John's stream. Immediately, people can see whose stream is being manipulated (because stream positions usually don't move in space so users readily know whose stream is where), and in that case Mary's name can be overlaid over John's "fake" stream so peers know who is driving John's stream.

3. In a third embodiment, several people might navigate to different parts of John's stream; in that case, John's stream is divided into several sub-regions, each showing the past frames from his stream as they are manipulated by others.

4. In a fourth embodiment, Mary shows only that she is looking at a past event, but not what she is looking at. In this case, the interface can, for example, only highlight the past event in other participant's timelines.

In one or more embodiments, during this action, the live video is still coming and thus the participant can still hear the live audio. But the video stream is "hidden" under the currently selected frame from the past. In another embodiment, the live video can be shown next to the frame being selected, or over the selected frame as in a typical video-in-video (picture-in-picture) montage, which can be located, for example, in the corner of the screen 704, see picture-in-picture mage 714.

In one or more embodiments, the user interface generated by the user interface generation module 220 (321) can also provide quick query selectors to select only a few content-types, e.g. only slide frames so that when the user goes back into the past, only these frames will be shown. In one or more embodiments, the aforesaid user interface also provides a quick "live" button for participants to display the current streams of a person.

In one or more embodiments, after using the aforesaid user interface for selecting a frame from the past, the user can choose to broadcast the selected frame as his own stream instead of his current camera feed. As would be appreciated by those of skill in the art, it may be very useful to let other participants know what that user is looking at and focus the conversation on earlier parts. When the user decides to show others what he is looking at, he can also choose to send along his mouse pointer location so other peers can see what he is pointing at, as shown in FIG. 3. This does not require tracking his mouse pointer in the video stream, but merely involves getting its coordinates. (i.e., using Javascript mouse event listeners added to the HTML element representing the surface being broadcast). Using a similar concept, if a user decides to share his screen, he can also choose to crop the shared area to only show a part of his screen.

Figure 8:
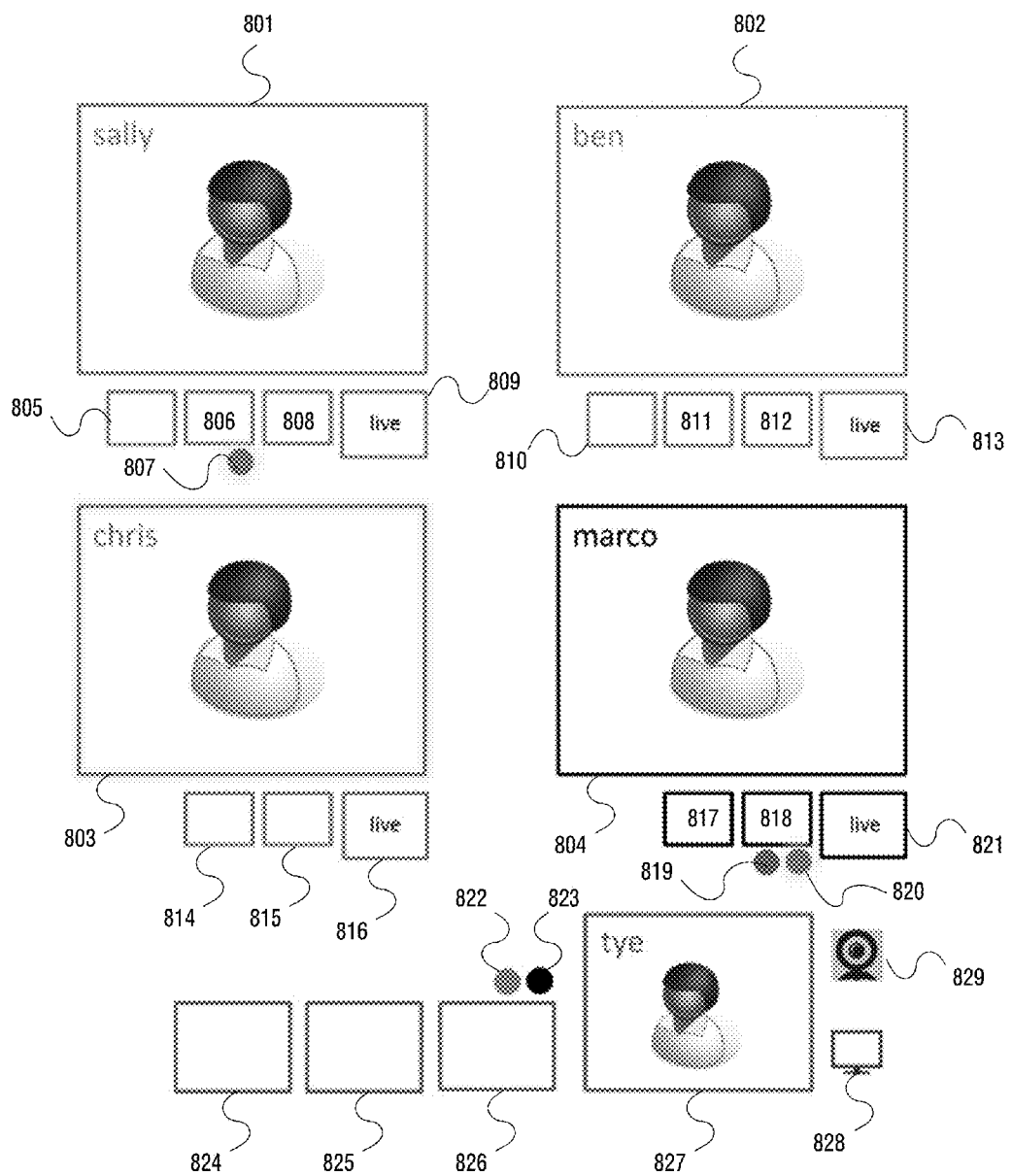
FIG. 8 shows another exemplary embodiment of a graphical user interface generated by the graphical user interface generation module of the video conferencing application.

FIG. 8 shows another exemplary embodiment of a graphical user interface generated by the graphical user interface generation module 220 (321). This embodiment corresponds to a video conference with more than two participants and the respective video conferencing streams. Specifically, the graphical user interface in FIG. 8 corresponds to five video conference participants (the participants are named Tye, Sally, Ben, Chris and Marco) and shows the view of the particular conference participant Tye. Thumbnails 824, 825 and 826 representing Tye's history and the live stream 827 appear along the bottom of the graphical user interface. In addition, the embodiment of the user interface shown in FIG. 8 incorporates Sally's live stream 801 as well as thumbnails 805, 806, 808 and 809 representing Sally's sharing history. The shown user interface further includes Ben's live stream 802 as well as thumbnails 810, 811, 812 and 813 representing Ben's sharing history. The shown user interface yet further includes Chris' live stream 803 as well as thumbnails 814, 815 and 816 representing Chris' sharing history. The shown user interface yet further includes Marco's live stream 804 as well as thumbnails 817, 818 and 821 representing Marco's sharing history.

In the shown embodiment of the graphical user interface, colored dots 807, 819, 820, 822 and 823 positioned in the vicinity of thumbnail(s) in the sharing histories of various users indicate which frame in the sharing history is being viewed by a specific user. In one or more embodiments, to uniquely identify the user viewing content corresponding to the specific thumbnail, the color of the dots 807, 819, 820, 822 and 823 corresponds to the color of a panel of this specific user. For example, Chris, whose dots 807 and 820 have a blue color (the same as the color of the border of Chris' panel 803), is looking at frames in Sally's and Marco's history, as indicated by blue dots 807 and 820 appearing on or adjacent to the frames Chris is looking at in Sally's and Marco's timelines.

In one or more embodiments, selecting one of the user panels 801, 802, 803 or 804 highlights the frames that the selected user is currently viewing. Also, the user can toggle between showing their camera or their display using user interface widgets 829 and 828, respectively. Finally, in one or more embodiments, the user is able to drag and drop into their live view any frame from another user's timeline to stream it instead.

Exemplary Operating Sequence

Figure 9:
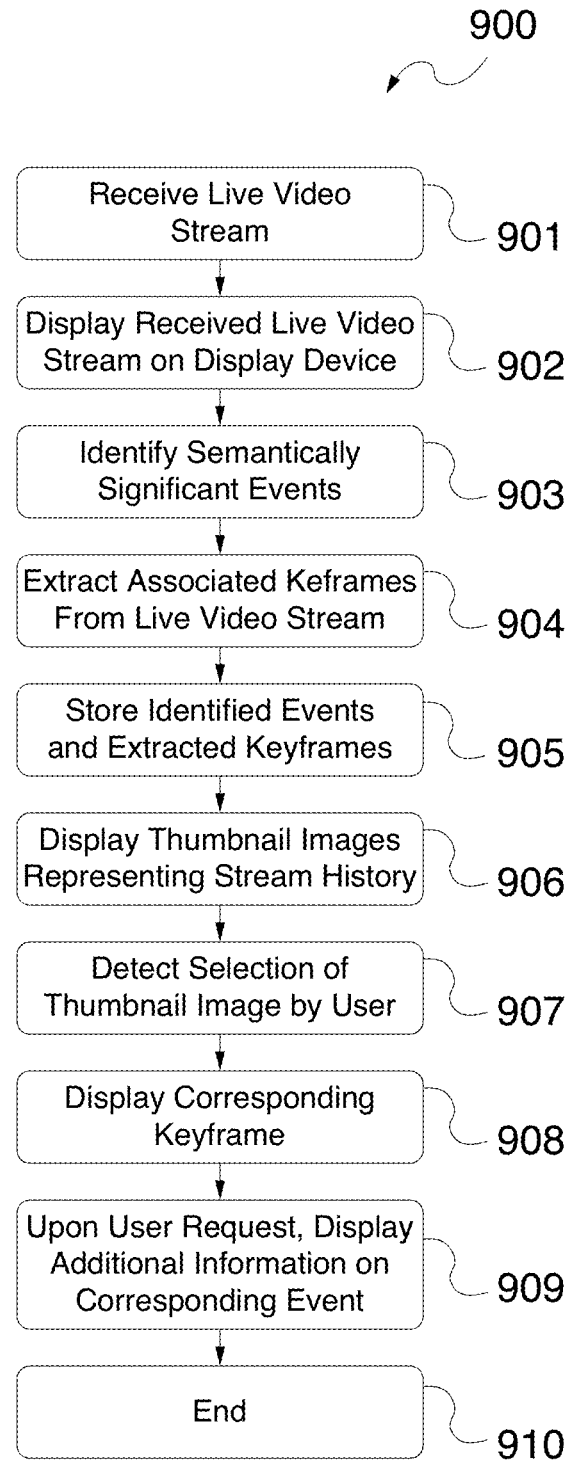
FIG. 9 illustrates an exemplary operating sequence of an embodiment of a method for real-time efficient navigation of multiple video conferencing streams.

FIG. 9 illustrates an exemplary operating sequence 900 of an embodiment of a method for real-time efficient navigation of multiple video conferencing streams. In one or more embodiments, this sequence 900 may be performed by the computerized system 200 shown in FIG. 2 or the computerized desktop system 300 shown in FIG. 3 in connection with the software stored in the respective memory unit 212 (312). First, at step 901, the stream receiving module 216 (317) receives an incoming live video stream through the network interface 205 (305) of the respective computerized system 200 (300). It should be noted that the aforesaid live video stream does not have to be the video stream transmitted at the exact same time as the video being shot. The live video stream can be any video stream which is being continuously transmitted by the remote computerized system even when the local user controls (e.g. interrupt, rewind or forward) the playback at the local computerized system.

The received live video may be a live video conference stream originating from a remote computer system of another participant in the video conference or a live broadcast stream sent by a broadcast server. At step 902, the received live video scream is displayed to the user on the display device 209 (309) using the graphical user interface generated by the graphical user interface generation module 220 (321), the exemplary embodiments of which are shown in FIGS. 7 and 8. Specifically, in FIG. 7, panels 701 and 703 are used to display live video stream to the users.

At step 903, the stream analysis module 217 (318) identifies semantically significant events in the received live video stream in accordance with techniques described above. The associated keyframes are extracted at step 904. At step 905, the information on the identified semantically significant events and the extracted keyframes is stored in the stream metadata storage 222 (323).

At step 906, the thumbnail images representing the history of the live video stream are displayed to the user using, for example, the embodiments of the graphical user interfaces shown in FIGS. 7 and 8. When, at step 907, the user selects one of the displayed thumbnail images in the aforesaid history, at step 908 the corresponding keyframe is displayed to the user as illustrated, for example, in FIG. 7 (panels 702 and 704) either replacing or supplementing the live video stream. Upon an instruction from the user, additional information on the corresponding semantically significant event may also be displayed, see step 909. The process ends at step 910.

Automatic Switching Between Screen Sharing and Face

The conventional video conferencing tools force users to think about switching back and forth between showing their face or their screen and to perform the switching manually. On the other hand, if a user starts sharing her screen but doesn't switch back to showing her face even though she doesn't interact with her screen, it might look rude to others. Accordingly, in one or more embodiments, the video conferencing application 215 (316) is configured to use the video stream labels described above to remind the user or automatically switch to showing back the face. Similarly, if a user has lots of desktop activity and is engaged verbally, then it is very likely that she is trying to show something on the desktop to her peers: in that case, the video conferencing application 215 (316) suggests or automatically switches to screen-sharing.

Instant Meeting Minutes

In one or more embodiments, at any time, but especially at the end of a video session, at participant's request, the video conferencing application 215 (316) is configured to export the set of frames and accompanying time and metadata generated by each participant's actions or all participants' actions. In response to the aforesaid request from the user, the video conferencing application 215 (316) retrieves this information, which is normally stored in the data storage 220 (321), and automatically compiles a document representing the minutes of the video conference.

In one or more embodiments, the compiled document is formatted as an editable document, such as a text editor document, wherein a user can subsequently insert textual notes using a text editor. In an alternative embodiment, the compiled document is an XML document created in accordance with a predetermined XML schema. As would be appreciated by those of skill in the art, XML provides increased flexibility for importing the content of the compiled document into a variety of software applications. In yet alternative embodiment, the compiled document is an HTML document.

In one or more embodiments, the compiled document containing the minutes of the teleconference comprises a layout, in temporal order, of the event keyframes automatically detected from all participants' streams, as described above. In addition, the document may include information on the actions taken by participants during the video meeting. For example, if a specific frame was reviewed several times by one or more participants, the generated document can emphasize that frame using size or other visual cues, such as a number of "views", which may be placed next to the respective frame.

Implementation of an Exemplary Embodiment

In one or more embodiments, the video conferencing application 215 (316) is implemented based on the WebRTC standard well known to persons of ordinary skill in the art. The video conference participants use their web browsers to connect with each other and the streams come as HTML5 video streams that are processed by the CANVAS element for pixel manipulation. When a user wants to share their screen, the video conferencing application 215 (316) switches the feed from the camera 211 (311) for that of the desktop using, for example, the following command:

```
navigator.webkitGetUserMedia(
  {video:{mandatory: {chromeMediaSource: 'screen'}}},
  this.onUserMediaSuccess.bind(this),
  this.onUserMediaError.bind(this)
);
```

While one embodiment implements the described algorithms in a peer-to-peer environment, where each browser can perform its own computation on the incoming streams of each participant, another embodiment relies on a cloud-based implementation. For example, in one implementation, a "robot" service could be invited to connect to an ongoing peer-to-peer conference and apply the same algorithms on each participant's stream in the cloud. This "robot" could serve many purposes, such as allowing users to obtain a meaningful index of their session, could be used for compliance purposes, or provide expensive processing services such as an optical character recognition (OCR) or a voice-to-text transcription.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for real-time efficient navigation of multiple video streams. It is intended that the specification and examples be considered as exemplary only, with a true scope and spirit of the invention being indicated by the following claims.

What is claimed is:

1. A computer-implemented method performed in a computerized system comprising a central processing unit, a display device, a network interface and a memory, the computer-implemented method comprising:

a. using the network interface to receive a live video stream from a remote computerized system, the live video stream comprising a plurality of frames;
   b. displaying the received live video stream on the display device;
   c. using the central processing unit to identify a plurality of semantically significant events in the received live video stream;
   d. associating each of the identified plurality of semantically significant events with a respective keyframe from the live video stream;
   e. using the memory to store information on the identified plurality of semantically significant events and the associated keyframes;
   f. generating a navigable graphical user interface on the display device, the navigable graphical user interface displaying user-selectable representations of the keyframes from the live video stream; and
   g. in response to detection of an instruction from a user in connection with the navigable graphical user interface, displaying a keyframe associated with one of the identified plurality of semantically significant events on the display device, wherein the keyframe is displayed on the display device in addition to, or replacing the displayed received live video stream and wherein the one of the identified plurality of semantically significant events is a past event previously displayed to the user as a part of the live video stream.

2. The computer-implemented method of claim 1, wherein the instruction from the user comprises a selection event of one of the displayed keyframe representations by the user, the method further comprising displaying to the user information on the semantically significant event associated with the one of the keyframe representations selected by the user.

3. The computer-implemented method of claim 1, wherein in f. the displayed live video stream is replaced with the keyframe.

4. The computer-implemented method of claim 1, further comprising displaying to the user information on the semantically significant event, wherein the information on the semantically significant event displayed to the user comprises a second plurality of frames from the received live video stream corresponding to the semantically significant event.

5. The computer-implemented method of claim 1, further comprising using the network interface to indicate to the remote computerized system an information on the semantically significant event displayed to the user.

6. The computer-implemented method of claim 5, further comprising generating a second live video stream and transmitting the generated second live video stream to the remote computerized system using the network interface, wherein the information on the semantically significant event displayed to the user is indicated to the remote system by replacing the second live video stream with the information on the semantically significant event displayed to the user.

7. The computer-implemented method of claim 1, wherein the semantically significant event is selected from a text event, a text scroll event, a face event, a desktop event and a mouse event.

8. The computer-implemented method of claim 1, wherein prior to c., the live video stream is down-sized.

9. The computer-implemented method of claim 1, wherein in c., the plurality of semantically significant events in the received live video stream are identified by performing image analysis of plurality of frames in the received live video stream.

10. The computer-implemented method of claim 9, further comprising transmitting the information on the identified plurality of semantically significant events to the remote computerized system.

11. The computer-implemented method of claim 1, wherein in c., the plurality of semantically significant events in the received live video stream are identified using metadata received from the remote computerized system.

12. The computer-implemented method of claim 1, further comprising:
   a. generating a second live video stream using a feed from a camera or a desktop activity based on a selection received from the user;
   b. displaying a suggestion to the user to select the desktop activity if a predetermined desktop activity is detected; and
   c. transmitting the generated second live video stream to the remote computerized system using the network interface.

13. The computer-implemented method of claim 1, further comprising:
   a. generating a second live video stream using a feed from a camera or a desktop activity based on a selection received from the user;
   b. displaying a suggestion to the user to select the feed from the camera if a predetermined desktop activity is not detected; and
   c. transmitting the generated second live video stream to the remote computerized system using the network interface.

14. The computer-implemented method of claim 1, wherein the respective keyframe associated with each of the identified plurality of semantically significant events is selected from the plurality of frames of the live video stream.

15. The computer-implemented method of claim 14, wherein selecting the respective keyframe comprises identifying a second plurality of frames from the live video stream corresponding to the each of the identified plurality of semantically significant events, wherein the respective keyframe is selected, based on a type of the each of the identified plurality of semantically significant events, to be one of:
   i. a first frame in the second plurality of frames;
   ii. a last frame in the second plurality of frames;
   iii. a middle frame in the second plurality of frames; or
   iv. a representative frame of the second plurality of frames.

16. The computer-implemented method of claim 1, wherein the live video stream is a broadcasting television video stream.

17. The computer-implemented method of claim 1, wherein the computerized system and the remote computerized system are participating in a video conference session and the live video stream is a video conferencing stream.

18. The computer-implemented method of claim 1, wherein the live video stream comprises a live audio track and wherein while the keyframe associated with one of the identified plurality of semantically significant events is displayed on the display device, the live audio track continues to be played to the user.

19. A non-transitory computer-readable medium embodying a set of computer-executable instructions, which, when executed in a computerized system comprising a central processing unit, a display device, a network interface and a memory, cause the computerized system to perform a method comprising:
   a. using the network interface to receive a live video stream from a remote computerized system, the live video stream comprising a plurality of frames;
   b. displaying the received live video stream on the display device;
   c. using the central processing unit to identify a plurality of semantically significant events in the received live video stream;
   d. associating each of the identified plurality of semantically significant events with a respective keyframe from the live video stream;
   e. using the memory to store information on the identified plurality of semantically significant events and the associated keyframes;
   f. generating a navigable graphical user interface on the display device, the navigable graphical user interface displaying user-selectable representations of the keyframes from the live video stream; and
   g. in response to detection of an instruction from a user in connection with the navigable graphical user interface, displaying a keyframe associated with one of the identified plurality of semantically significant events on the display device, wherein the keyframe is displayed on the display device in addition to, or replacing the displayed received live video stream and wherein the one of the identified plurality of semantically significant events is a past event previously displayed to the user as a part of the live video stream.

20. A computerized system comprising a central processing unit, a display device, a network interface and a memory storing a set of instructions, the set of instructions comprising instructions for:
   a. using the network interface to receive a live video stream from a remote computerized system, the live video stream comprising a plurality of frames;
   b. displaying the received live video stream on the display device;
   c. using the central processing unit to identify a plurality of semantically significant events in the received live video stream;
   d. associating each of the identified plurality of semantically significant events with a respective keyframe from the live video stream;
   e. using the memory to store information on the identified plurality of semantically significant events and the associated keyframes;
   f. generating a navigable graphical user interface on the display device, the navigable graphical user interface displaying user-selectable representations of the keyframes from the live video stream; and
   g. in response to detection of an instruction from a user in connection with the navigable graphical user interface, displaying a keyframe associated with one of the identified plurality of semantically significant events on the display device, wherein the keyframe is displayed on the display device in addition to, or replacing the displayed received live video stream and wherein the one of the identified plurality of semantically significant events is a past event previously displayed to the user as a part of the live video stream.

21. A computer-implemented method performed in a computerized system comprising a central processing unit, a display device, a network interface and a memory, the computer-implemented method comprising:
   a. using the network interface to receive a live video stream from a remote computerized system, the live video stream comprising a plurality of frames;
   b. displaying the received live video stream on the display device;

c. using the central processing unit to identify a plurality of semantically significant events in the received live video stream;
d. associating each of the identified plurality of semantically significant events with a respective keyframe;
e. using the memory to store information on the identified plurality of semantically significant events and the associated keyframes;
f. in response to detection of an instruction from a user, displaying a keyframe associated with one of the identified plurality of semantically significant events on the display device, wherein the keyframe is displayed on the display device in addition to, or replacing the displayed received live video stream and wherein the one of the identified plurality of semantically significant events is a past event previously displayed to the user as a part of the live video stream;
g. generating a second live video stream using a feed from a camera or a desktop activity based on a selection received from the user;
h. displaying a suggestion to the user to select the desktop activity if a predetermined desktop activity is detected or displaying a suggestion to the user to select the feed from the camera if a predetermined desktop activity is not detected; and
i. transmitting the generated second live video stream to the remote computerized system using the network interface.

* * * * *